United States Patent
Baki et al.

(10) Patent No.: US 11,188,173 B2
(45) Date of Patent: Nov. 30, 2021

(54) SYSTEM AND METHOD OF TOOL IDENTIFICATION FOR AN INTERACTIVE INPUT SYSTEM

(71) Applicant: SMART TECHNOLOGIES ULC, Calgary (CA)

(72) Inventors: Rola Baki, Calgary (CA); Trevor Wellington, Calgary (CA); Colin Gowen, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 0 days.

(21) Appl. No.: 17/290,954

(22) PCT Filed: Oct. 31, 2019

(86) PCT No.: PCT/CA2019/051546
§ 371 (c)(1),
(2) Date: May 3, 2021

(87) PCT Pub. No.: WO2020/102883
PCT Pub. Date: May 28, 2020

(65) Prior Publication Data
US 2021/0311603 A1 Oct. 7, 2021

Related U.S. Application Data

(60) Provisional application No. 62/769,782, filed on Nov. 20, 2018.

(51) Int. Cl.
*G06F 3/041* (2006.01)
*G06F 3/0354* (2013.01)
*G06F 3/046* (2006.01)

(52) U.S. Cl.
CPC ...... *G06F 3/04166* (2019.05); *G06F 3/03545* (2013.01); *G06F 3/046* (2013.01)

(58) Field of Classification Search
CPC ... G06F 3/04166; G06F 3/03545; G06F 3/046
See application file for complete search history.

(56) References Cited

U.S. PATENT DOCUMENTS

2017/0123554 A1* 5/2017 Villar .................. G06F 3/046
2019/0033991 A1* 1/2019 Shirai ................ G06F 3/03545

* cited by examiner

*Primary Examiner* — Lisa S Landis
(74) *Attorney, Agent, or Firm* — Dickinson Wright PLLC; Andrew D. Dorisio

(57) ABSTRACT

An interactive input system, a tool and a method for detecting the tool's identity in the interactive input system are provided, in which a touch location of the tool is detected. The system comprises a plurality of antennas. A set of selected antennas associated with the touch location are activated to generate electromagnetic field, thereby activating the tool to send out a unique identifier associated with an attribute of the pen tool. The unique identifier is received and detected by the interactive input system to determine the attribute of the pen tool. The pen tool comprise at least one coil, and at least one NFC transponder, wherein the at least one coil is activated by electromagnetic field to power the NFC transponder for transmitting the unique identifier.

20 Claims, 5 Drawing Sheets

SYSTEM AND METHOD OF TOOL IDENTIFICATION FOR AN INTERACTIVE INPUT SYSTEM

FIELD

This invention is in the field of interactive input systems and methods, and more specifically to identification of passive tools used in conjunction with an interactive input system.

BACKGROUND

U.S. Pub. No. 2013/0257825 to SMART Technologies ULC, the contents of which are herein explicitly incorporated by reference in its entirety, discloses a pen tool brought into proximity with an interactive surface during image frame capture. An image sensor of an imaging assembly may see a bright region having a high intensity above the bright band corresponding to infrared illumination that impinges on a filtered reflector of the pen tool and is filtered and reflected by reflective and filtering elements. If the filtering element of the pen tool does not have the same passband as the IR-bandpass filter associated with an IR LED that is ON, the image frame captured by the image sensor of the imaging assembly may not comprise a bright region having an intensity greater than the intensity threshold. By comparing the intensity of the bright region to the intensity threshold and by monitoring which IR LED is ON, an identity of the pen tool may be determined.

Once the identity of the pen tool is determined, the identity may be used to assign an attribute such as for example a pen colour (red, green, black, blue, yellow, etc.) or a pen function (mouse, eraser, passive pointer) to the pen tool. In the event the pen tool is assigned the pen function of a mouse, the pen tool may be further assigned a sub-attribute such as for example a right mouse click, a left mouse click, a single mouse click, or a double mouse click. The pen tool may alternatively be associated with a particular user.

U.S. Pub. No. 2009/0160801 to SMART Technologies ULC, the contents of which are herein explicitly incorporated by reference in its entirety, discloses active radio frequency (RF) pens used with an analog resistive touch sensitive screen having a controller capable of recording RFID tags broadcast by such pens when the pens are used to contact the touch surface. Since the controller of the touch sensitive screen receives pointer position data and the RFID tag when the RF pen is used to contact the touch surface but only receiving pointer position data when a finger is used to contact the touch surface, the computer is able to differentiate automatically between finger and RF pen contacts on the touch surface. The RFID tag may also be selected to specify the color of the RF pen. Active pens may also be used with a camera-based touch system.

U.S. Pub. No. 2016/0057124 to SMART Technologies ULC, the contents of which are herein explicitly incorporated by reference in its entirety, discloses when a pointer is brought into contact with an NFC antenna, the pointer identifies itself as such to a pointer interface. The pointer interface requests a public key of the pointer and a biometric template corresponding to the user holding the pointer. The pointer interface compares the biometric template to the preexisting template stored in memory. If a successful match is found, the pointer interface transmits login information to the pointer.

The pointer has a processor executing instructions from volatile or non-volatile memory and storing data thereto. A battery supplies power to all the components of the pointer and may be rechargeable or non-rechargeable and replaceable. The pointer may have buttons allowing the user to change characteristics of the pointer such as virtual ink colour, style, or to initiate pairing between the pointer and a particular mobile device or communal device. The pressure on the pointer could also be used to modulate the thickness of the digital ink. The pointer has a transceiver coupled to an NFC antenna for pairing and communicating between the pointer and a particular mobile device or a particular communal device. Furthermore, the pointer has a transceiver coupled to a WiFi or Bluetooth antenna in order to communicate accelerometer/gyroscope, button, biometric sensor, or battery status information to the communal device. The pointer has a unique identifier stored within the memory thereof.

U.S. Pub. No. 2013/0109305 discloses a near-field communication system.

SUMMARY

According to one aspect, an interactive input system is provided including an interactive input area for at least one tool to interact. The interactive input system comprises at least one touch sensor detecting at least one touch of the at least one tool. A plurality of antennas are located under the interactive input area. A processing structure is connected with the at least one touch sensor and the plurality of antennas for determining at least one touch location of the tool present in the interactive input area, and for detecting at least one attribute of each tool. The processing structure upon receiving a signal of the touch location determined, activates a set of selected antennas associated with the touch location to generate electromagnetic field, thereby activating the tool approximate to the touch location to send out an identity associated with the attribute. The attribute of the tool is determined by the processing structure by detecting the identity.

According to a further aspect, the electromagnetic field generated by the selected antennas is sufficient to activate at least one NFC transponder in the tool to transmit the identity to the processing structure when the tool is in contact with the interactive input area.

According to another aspect, the processing structure of the interactive input system comprises a plurality of NFC readers for receiving the tool's identity. The identify is transmitted via the selected antennas and received by a corresponding NFC reader.

According to another aspect, the processing structure comprises a touch master printed circuit board for determining the touch location, and a processor for receiving the signal of the touch location determined by the touch master printed circuit board. The processor determines the selected antennas associated with the touch location, and activates the corresponding NFC reader to transmit the activation signal to the selected antennas. The processing structure further comprises a plurality of switches connected between the plurality of antennas and the plurality of NEC readers. The plurality of switches are used to route an activation signal to the selected antenna via an antenna matching circuitry to activate the NFC transponder.

According to another aspect, a tool for use with an interactive input system having a plurality of antennas is provided. The tool comprises at least one coil and at least one NFC transponder. The at least one coil is activated by electromagnetic field generated by a set of selected antennas associated with a touch location of the tool approximate to the interactive input system to power the at least one NFC transponder. The at least one NFC transponder transmits out an identity associated with an attribute of the tool. The identity is received by the interactive input system for determining the attribute of the tool.

According to another aspect, a method for identifying at least one tool used with an interactive input system is provided, wherein the interactive input system comprises a plurality of antennas under an interactive input area. The method comprises the steps: detecting a touch location of each of the at least one tool approximate to the interactive input area; selecting a set of antennas associated with the touch location among the plurality of antennas; generating electromagnetic field from the selected set of antennas; activating the tool approximate to the touch location by the electromagnetic field; transmitting an identity associated with an attribute of the tool; receiving and detecting the identity; determining the attribute of the tool based on the identity.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1:
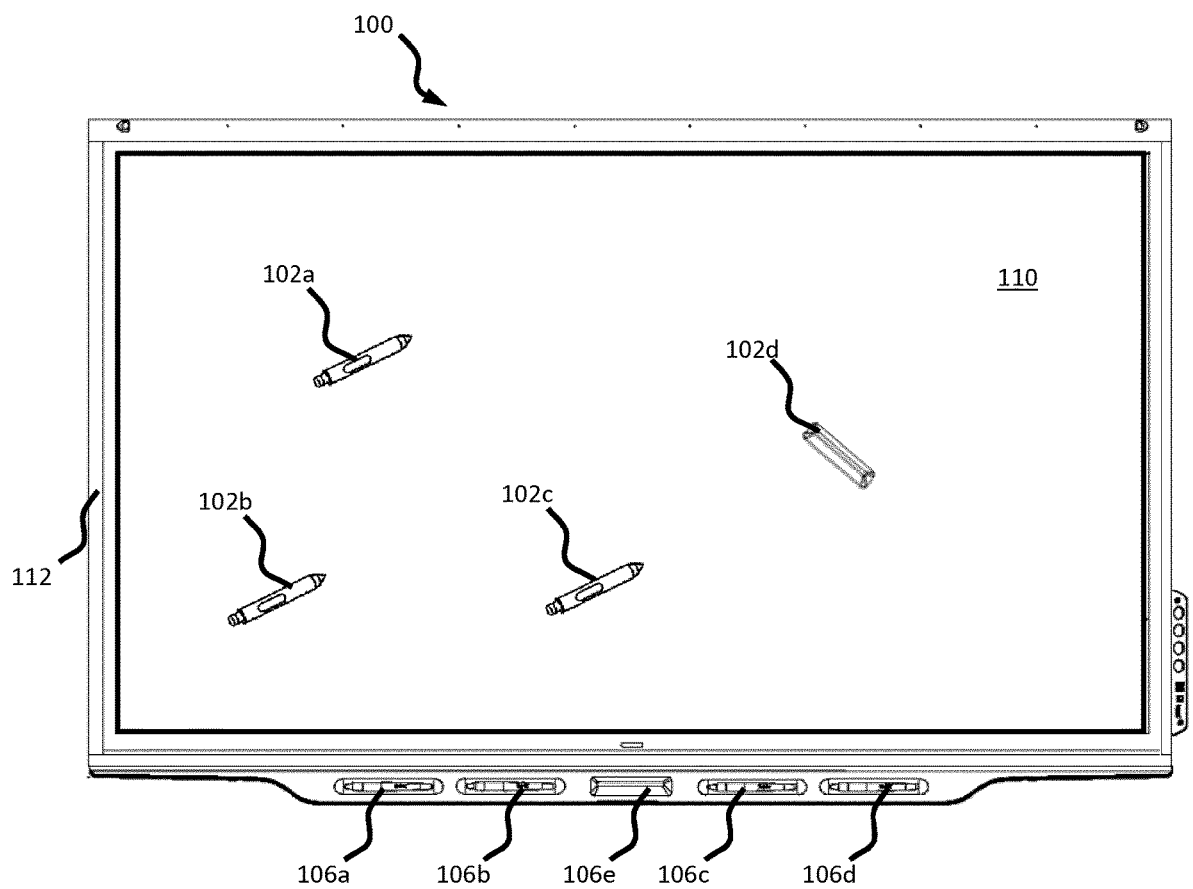
FIG. 1 is a perspective view of an interactive input system.
Figure 2:
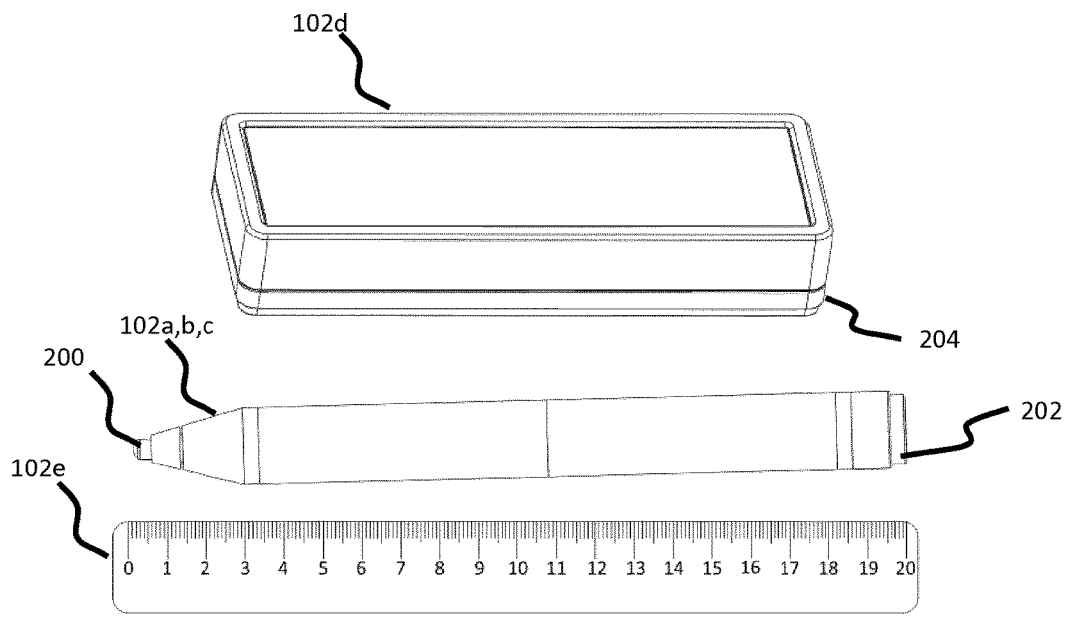
FIG. 2 is a perspective view of tools for use with the interactive input system.

As shown in FIG. 1, an interactive input system 100 detects a position of one or more input tools 102 shown in FIG. 2 that may comprise pointers 102a, 102b, 102c, one or more erasers 102d, one or more rulers 102e, and/or one or more letters 102f. The interactive input system 100 comprises an input area 110 that may be surrounded by a bezel 112 on a perimeter of the input area 110. The input area 110 may be aligned to a display projected thereon by a projector (not shown) or the input area 110 may overlay a display, such as an LCD display, LED display, OLED display, etc. One or more receptacles 106a-e may receive the tools 102a-f, when the tools 102a-f are not in use. The receptacles 106a-e may be sized and/or shaped for their respective tool 102a-f.

One or more touch sensors (not shown) may observe the input area 110 to detect a presence of the input tool(s) 102a-f. If the sensors detect the presence of the input tool(s) 102a-f, the sensors may determine the position of each of the input tool(s) 102a-f. Each of the pointers 102a,b,c may correspond to a set of different pointer attributes. For example, pointer 102a may correspond to a red pointer that when placed in contact with the input area 110 generates virtual red ink in the input area 110; pointer 102b may correspond to a blue pointer that when placed in contact with the input area 110 generates virtual blue ink in the input area 110; and so forth. Attributes may be associated with the other tools 102e-f, such as an eraser size for tool 102d, a ruler length for tool 102e, and/or a letter type for tool 102f.

Although touch system described herein are an optical touch system, the aspects described herein are not limited to certain types of touch systems. They can be selected from any type of touch sensors, such as optical sensor, capacitive touch sensor, resistive touch sensor, electromagnetic induction sensor, and/or any combination.

An enlarged presentation of the input tools 102a-f are presented in FIG. 2. The pointer 102a-c may comprise a writing end 200 and an erasing end 202. When the writing end 200 is placed in contact with the input area 110, the interactive input system registers digital ink at the position of the pointer 102a-c. Similarly, when the erasing end 202 is placed in contact with the input area 110, the interactive input system removes the digital ink at the position of the pointer 102a-c. The eraser 102d may comprise a larger area 204 that when brought into contact with the input area 110 may delete the larger area 204 of the digital ink at the position of the eraser 102d.

Figure 3:
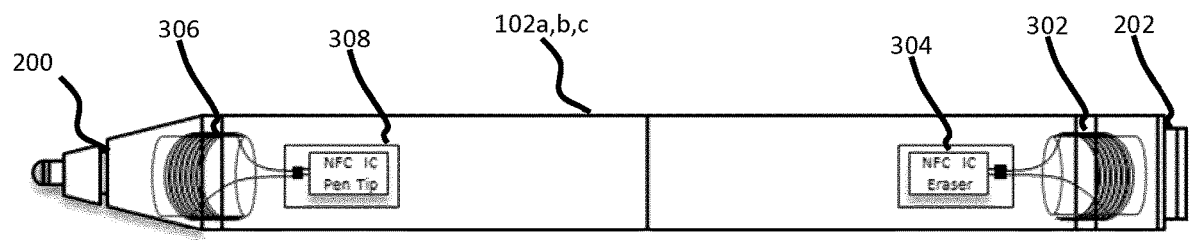
FIG. 3 is a cross sectional view of internal components of the tools.
Figure 4:
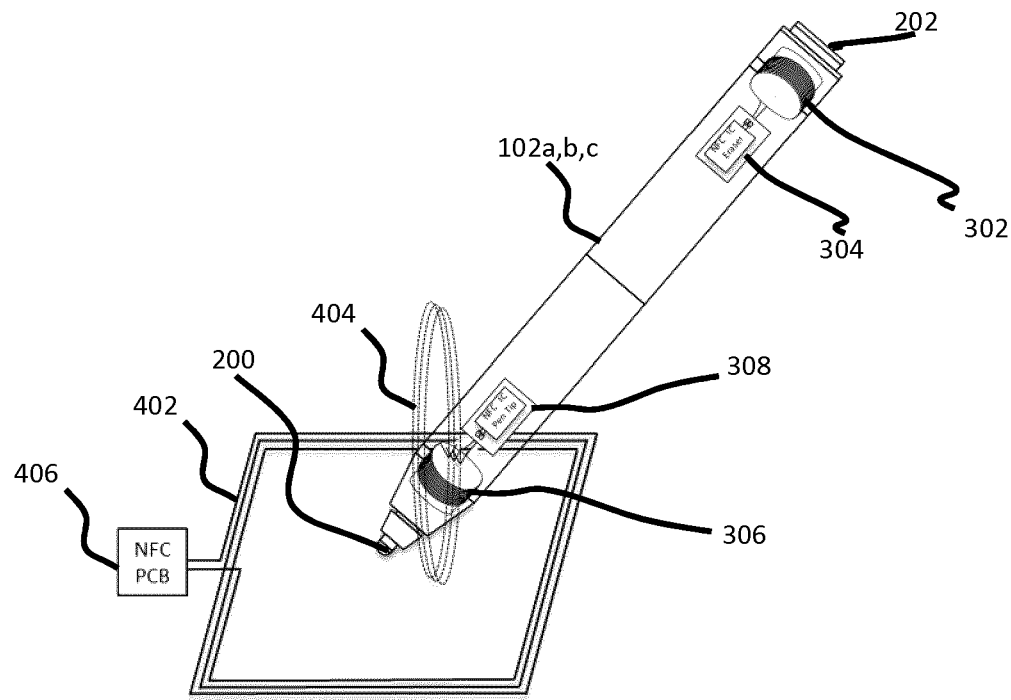
FIG. 4 is perspective view of the internal components of the tools interacting with the interactive input system.

Turning to FIGS. 3 and 4, the input tool 102a-f may comprise one or more coils 302, 306 with ferrite core. In this aspect, the input tool 102a-c may have a pair of coils 302, 306 with one of the coils 302, 306 on each end of the input tool 102a-c. In this example, there may be an eraser coil 302 and a pen coil 306. The coils may comprise a material constructed of 67-ROD or 61-ROD from Fair-Rite, the material data sheets herein explicitly incorporated by reference in their entirety.

The coils 302, 306 may be electrically connected to a near-field-communication (NFC) transponder 304, 308. The transponders 304, 308 may comprise two printed circuit boards (PCB) placed near each of the coils 302, 306 for fine tuning the resonance and Q-factor using capacitors and/or resistors so that the resonance of the coils 302, 306 matches with the radio frequency band used. In one aspect, the input tools 102a-f are passive in that the electrical components therein (e.g. transponders 304, 308) are only supplied electrical power from the coils 302, 306.

Each of the input tools 102a-f may have a unique identifier (UID) stored in the NFC transponder 304, 308, such that when the respective coil 302, 306 becomes activated by electromagnetic induction 404, the NFC transponder 304, 308 transmits the UID via the respective activated coil 302, 306. The NFC transponder 304, 308 may contain data (currently between 96 and 4,096 bytes of memory) and may be read-only or rewritable. The interactive input system 100 may receive the UID and determine the attributes of the input tool 102a-f based at least in part on the UID. The interpretation of the attributes of the input tool 102a-f may be preprogrammed and stored in the interactive input system 100. The UID may include the tool's series number, date of production, and/or information related to color.

The NFC transponder 304, 308 and coils 302, 306 operate within the globally available and unlicensed radio frequency ISM band. The tools 102a-f do not require power, as the tools 102a-f may be equipped with coils 302, 306 for being activated by an antenna 402 that supply power to one or more NFC transponders 304, 308. The tools 102a-f may be powered up though an antenna (e.g. coils) 402 located in the input area 110. The antenna 402 may retrieve the UID and may indicate an approximate location of the tool 102a-f.

In the example shown in FIG. 4, the input tool 102a-c may have multiple transponders 304, 308 electrically connected to a respective coil 302, 306. An eraser transponder 304 and coil 302 may be located near the eraser end 202 of the input tool 102a-c. A pen transponder 308 and coil 306 may be located near the pen end 200 of the input tool 102a-c. In one aspect, the antenna 402 may generate an electromagnetic induction field 404 of sufficient strength to activate the pen transponder 308 when the pen end 200 is in contact with the input area 110 using energy induced in the pen coil 306 while being less than a strength to induce energy in the eraser coil 302 when the eraser end 202 is further than the pen end 200 from the input area 110. In another aspect, the transponders 304, 308 may use load modulation where a data signal may be impressed onto a carrier wave generated by the antenna 402 by changing an electrical load (e.g. impedance) of the transponder 304, 308. The transponder 304, 308 may be able to transmit data, such as the UID, by varying the load and thus effecting voltage changes at the antenna 402. A detection system 800, described in further detail below, may then translate the voltage changes into a binary signal.

Figure 5:
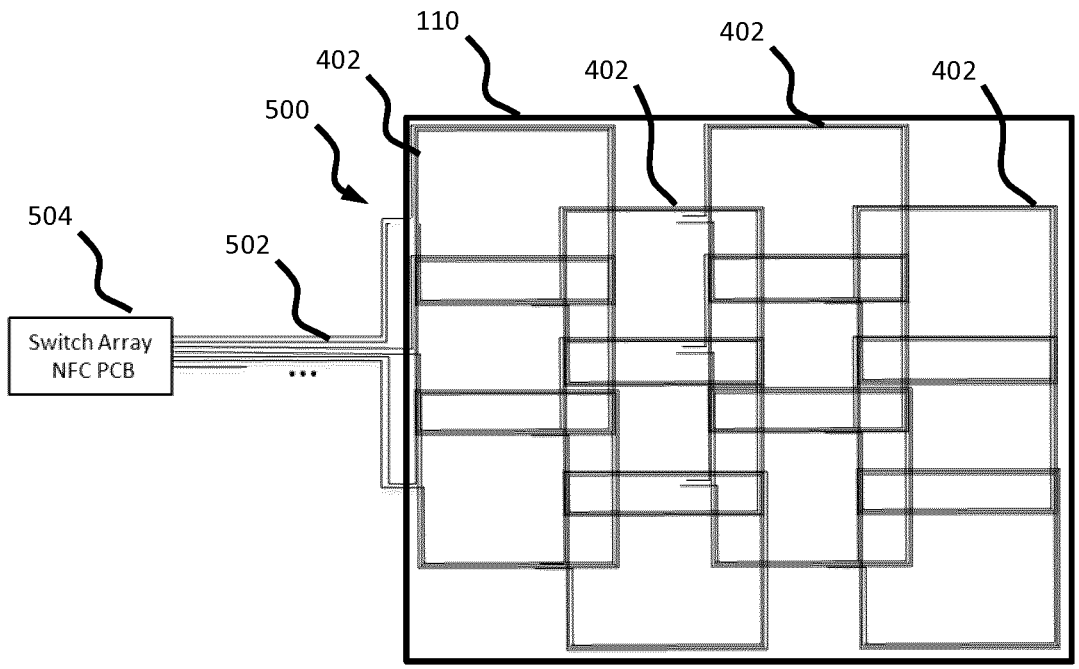
FIG. 5 is a diagram of one example of a detection system for detecting the tools.

As shown in FIG. 5, an antenna array 500 comprising a plurality of antennas 402 may be placed behind the input area 110. The antenna array 500 may be electrically coupled via a bus 502 to a switch array 504. As shown, the antenna array 500 may comprise square-shaped, rectangular-shaped, or looped-shaped antennas that may overlap in order to prevent gaps in the detection system. The switch array 504 may activate one or more of the antennas 402 to determine if the tool 102a-f is present in the area covered by the antennas 402. In this aspect, the input area 110 may detect a touch contact and subsequently instruct the switch array 504 to select the coil 402 that corresponds to the touch contact location. The antenna 402 activates the tool 102a-f and the transponder 304, 308 within the tool 102a-f responds with the UID. In another aspect, the switch array 504 may periodically poll each of the antennas 402 to detect the tool 102a-f that may be hovering above the input area 110.

When the input tool 102a-c is in contact with the input area 110, the tool 102a-c may be exactly perpendicular to the input area 110 or may be tilted with respect to the input area 110. When the input tool 102a-c is perpendicular to the input area 110, the antenna 402 directly underneath the touch location is selected and activated to generate the magnetetic field for detecting the UID of the input tool 102a-c. In some other aspects, when the tool 102a-c is in the tilt situation, multiple antennas 402 around the touch location, such as four antennas 402 at the upper left, lower left, upper right, and lower right of the touch location, may be scanned. The antenna 402 that generates a strongest signal is chosen to be used for detecting the UID of the input tool 102a-c.

Figure 6:
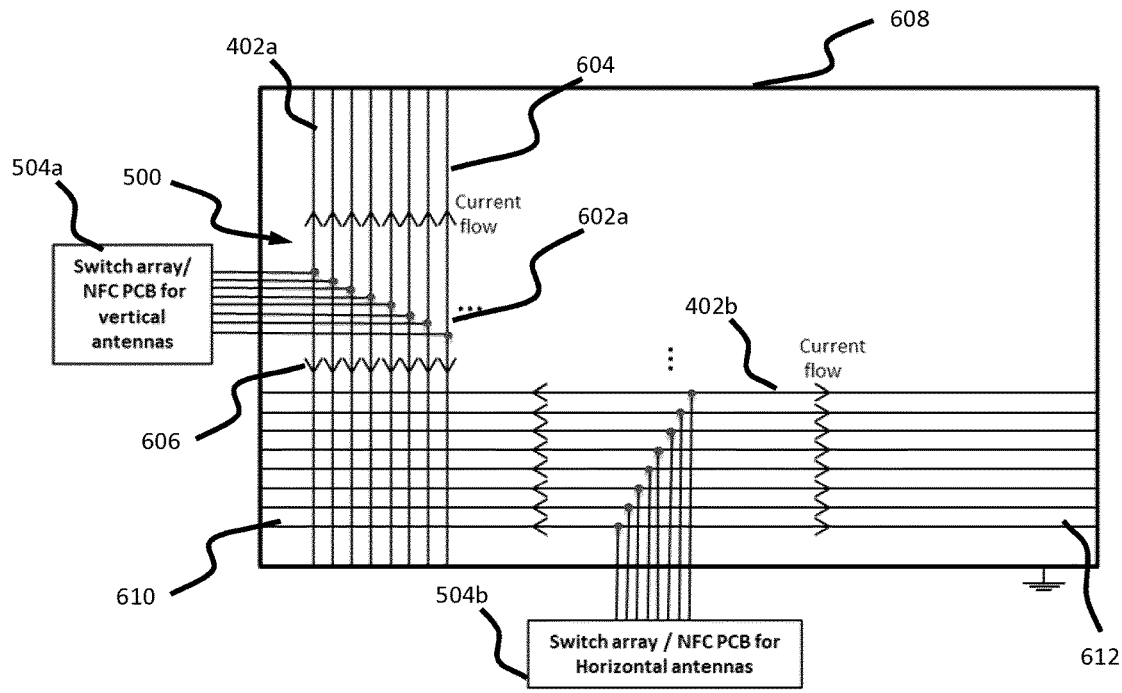
FIG. 6 is a diagram of another example of a detection system for detecting the tools.

FIG. 6 demonstrates another antenna array 500 may comprise a plurality of vertically oriented antennas 402a and a plurality of horizontally oriented antennas 402b. The vertically oriented antennas 402a may be electrically connected to a switch array 504a for vertical antennas. The horizontally oriented antennas 402b may be electrically connected to a switch array 504b for horizontal antennas. The switch arrays 504a-b may either scan through antennas 402a-b or may select a particular pair of antennas 402a-b.

A vertical signal fed from the vertically oriented switch arrays 504a to the antennas 402a may generally bifurcate the input area 110 into a top portion 604 and a bottom portion 606. The current along the antennas 402a may flow upwards for the top portion 604 and downwards for the bottom portion 606 to a ground 608 around a perimeter of the input area 110. Similarly, a horizontal signal fed from the horizontally oriented switch arrays 504b to the antennas 402b may generally bifurcate the input area 110 into a left side portion 610 and a right side portion 612. The current along the antennas 402b may flow in a left direction for the left side portion 610 and in a right direction for the right side portion 612 to the ground 608 around the perimeter of the input area 110. The configuration shown in FIG. 6 may allow no local current loops to be formed that may induce a current in the display. This configuration with horizontal and vertical antennas 402 may not work effectively with a TFT display panel because the antennas 402 may be aligned with pixels of the TFT display panel. However, this configuration may work well with other types of displays, for example a whiteboard touch display with a projection system.

Figure 7:
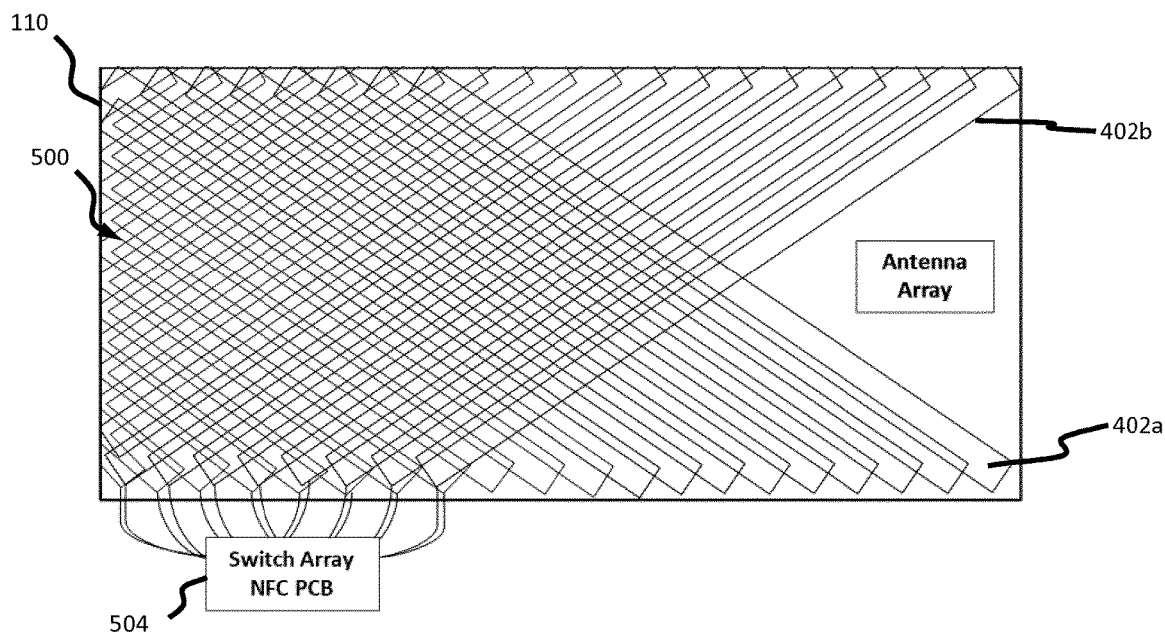
FIG. 7 is a diagram of yet another example of a detection system for detecting the tools.

In the aspect shown in FIG. 7, the antenna array 500 may comprise a plurality of antennas 402a and 402b that may be placed in a generally orthogonal orientation with respect to each other within the input area 110. Each of these plurality of antennas 402a-b may be connected to a switch array 504. The plurality of antennas 402a-b may be placed in diagonal orientation with respect to one or more edges of the input area 110 in order to minimize signal interference from the plurality of antennas 402a-b to a display. The plurality of antennas 402a-g may be differentially connected in order to reduce the common mode noise from the display.

In any of the aspects shown in FIGS. 5-7, the antenna array 500 may have overlapping antennas 402 that may be placed as close as 5-mm from backplane (e.g. ground plane) of the input area 110, which in this aspect may be a display such as a TFT display panel. The antenna array 500 may have a structure that compensates, using resonance matching and additional power output, for the losses due to Eddy current and/or magnetic field absorption in the ground plane. The display may have an effect on the magnetic field and may cause difficulty in transmitting and/or receiving NFC signals with long horizontal and/or vertical loop antennas.

In any of the aspect of shown in FIGS. 5-7, ferrite may be added around one or more edges of the input area 110. The ferrite on the edges strengthens the magnetic field generated by the antennas 402 to increase detection range in the direction perpendicular to the surface of the input area 110. For example, the stronger magnetic field facilitates the detection of a tool hovering about the input area 110.

Figure 8:
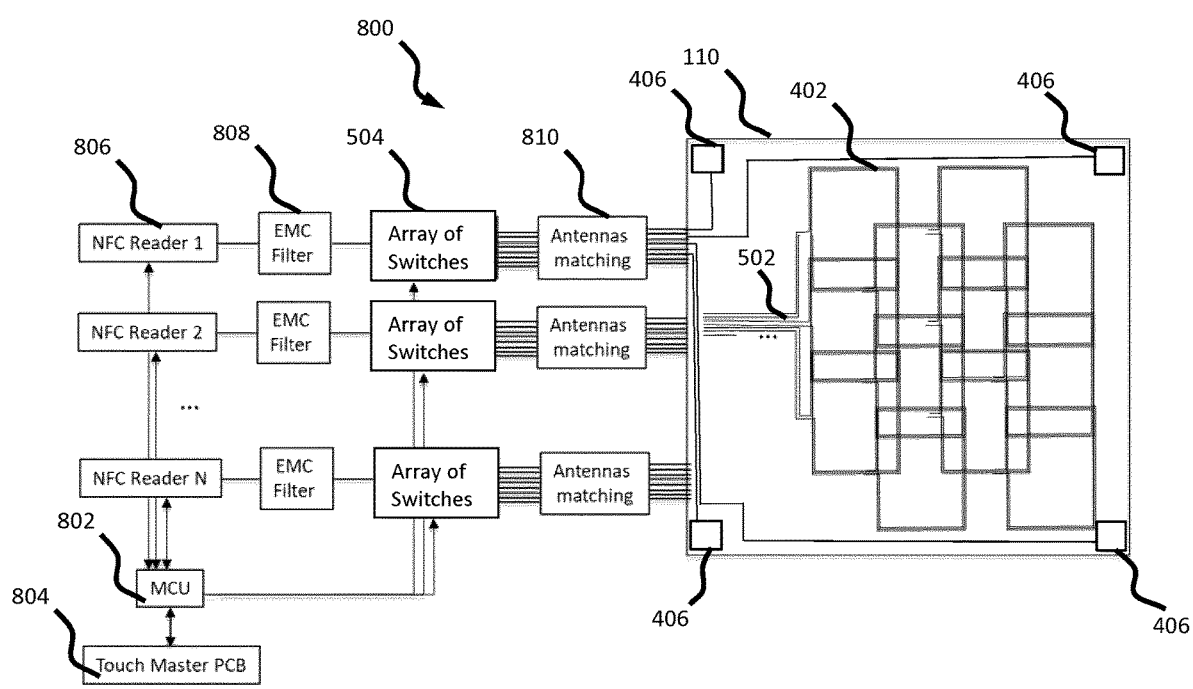
FIG. 8 is a block diagram of a computing structure for executing one or more methods for detecting the tools and adjusting functionality of the interactive input system.

Turning to FIG. 8, a detection system 800 for detecting the tools 102a-f is shown. A processor 802 may execute instructions from a memory (not shown). The processor 802 may receive a touch coordinate from a touch master printed circuit board (PCB) 804. When the processor 802 receives the touch coordinate, the processor 802 may determine an antenna 402 (or pair of antennas 402a-b) associated with a region of the touch coordinate. The processor 802 may then select the antenna 402 (or pair of antennas 402a-b) associated with the region using one or more array of switches 504. Once the antenna 402 is selected, the processor 802 activates a corresponding NFC reader 806. The NFC reader 806 transmits an activation signal through an EMC filter 808. The array of switches 504 may route the activation signal to the selected antenna 402 (or pair of antennas 402a-b) via antenna matching circuitry 810. The antenna matching circuitry 810 ensures each antenna 402 has a similar impedance for the NFC reader 806.

The selected antenna 402 (or pair of antennas 402a-b) generates the inductive field to activate the NFC transponder 304, 308. The NFC transponder 304, 308 then transmits its UID to the selected antenna 402. The NFC reader 806 may interpret the received signal from the NFC transponder 304, 308 to determine the UID and/or other information from the transponder 304, 308. The UID and/or the other information may then be passed to the processor 802. The processor 802 may then determine one or more attributes associated with the tool 102a-f. In an aspect, the processor 802 may activate physically adjacent antennas to the selected antenna 402 to resolve ambiguities, for example, in the case where two or more tools 102a-f may be closely located to each other, or where a single tool 102a-f may not be in an optimal position to be received correctly, such as in null positions or tilted tools 102a-f.

In other aspects, a set of smaller loops of antennas 406 as shown in FIG. 8 may be applied to the areas at the corners of the input area to enhance the magnetic field in the corners. For example, one set of the NFC reader 806, EMC filter 808, the array of switches 504 and antenna matching circuit 810 may be particularly associated with the set of smaller antenna loops 406 at the corners. The set of antenna loops 406 may have different scan rate from the main antenna loops 402 located under the majority of the input area 110.

In other aspects, the antennas 402 may be circular or spiral. Spatial multiplexing may be implemented, such as one loop may be connected in series between two antennas.

The aspects described herein may apply equally well to any educational tools 102, such as letters, numbers, shapes, rulers, etc., and may allow for hundreds of tools/objects to be paired to the interactive input system 100.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An interactive input system including an interactive input area for at least one tool to interact, comprising:
    at least one touch sensor for detecting at least one touch of the at least one tool;
    a plurality of antennas located under the interactive input area;
    a processing structure connected with the at least one touch sensor and the plurality of antennas for determining at least one touch location of the tool present in the interactive input area, and for determining at least one attribute of each of the at least one tool;
    wherein the processing structure upon receiving a signal of the touch location, activates a set of selected antennas associated with the touch location to generate electromagnetic field, thereby activating the tool approximate to the touch location to send out an identity associated with the attribute; the attribute of the tool is determined by the processing structure by detecting the identity.

2. The interactive input system of claim 1, wherein the electromagnetic field generated by the set of selected antennas is sufficient to activate at least one NFC transponder in the tool to transmit the identity to the processing structure when the tool is in contact with the interactive input area.

3. The interactive input system of claim 2, wherein the processing structure comprises a plurality of NFC readers for receiving the tool's identity.

4. The interactive input system of claim 3, wherein the tool's identity is transmitted via the selected antennas and received by a corresponding NFC reader.

5. The interactive input system of claim 4, wherein the NFC transponder is activated by an activation signal transmitted from the corresponding NFC reader via the selected antennas.

6. The interactive input system of claim 5, wherein the processing structure comprises a touch master printed circuit board for determining the touch location, and a processor for receiving the signal of the touch location determined by the touch master printed circuit board; the processor determines the selected antennas associated with the touch location, and activates the corresponding NFC reader to transmit the activation signal to the selected antennas.

7. The interactive input system of claim 6, wherein the processing structure further comprises a plurality of switches connected between the plurality of antennas and the plurality of NFC readers, the plurality of switches routing the activation signal to the selected antennas via an antenna matching circuitry.

8. The interactive input system of claim 1, wherein the plurality of antennas comprise any one of square-shaped, rectangular-shaped, and looped-shaped overlapping antennas.

9. The interactive input system of claim 8, wherein the plurality of antennas are placed in a generally orthogonal orientation with respect to each other within the input area.

10. The interactive input system of claim 8, wherein the plurality of antennas are placed in a generally diagonal orientation with respect to one or more edges of the input area.

11. The interactive input system of claim 1, wherein the plurality of antennas comprises a plurality of small antennas each located at one corner of the input area.

12. The interactive input system of claim 1, wherein the attribute of the tool is associated with any one of color, erasing, mouse function and a particular user.

13. A method for identifying at least one tool used with an interactive input system, the interactive input system having a plurality of antennas under an interactive input area, comprising:
    detecting a touch location of each of the at least one tool approximate to the interactive input area;
    selecting a set of antennas associated with the touch location among the plurality of antennas;
    generating electromagnetic field from the selected set of antennas;
    activating the tool approximate to the touch location by the electromagnetic field;
    transmitting an identity associated with an attribute of the tool;
    receiving and detecting the identity;
    determining the attribute of the tool based on the identity.

14. The method of claim 13, wherein the step of activating the tool comprises activating a NFC transponder located within the tool.

15. The method of claim 14, wherein activating the NFC transponder comprises transmitting an activation signal from an NFC reader of the interactive input system to the NFC transponder via the selected set of antenna.

16. The method of claim 15, wherein the step of transmitting the identity comprises transmitting an unique identifier of the tool by varying a load associated with the NFC transponder and thus effecting voltage changes at the selected antennas.

17. The method of claim 16, wherein the receiving step comprises receiving the unique identifier from the NFC transponder of the tool via the selected set of antennas.

18. A tool for use with an interactive input system having a plurality of antennas, comprising:
   at least one coil; and
   at least one NFC transponder;
   wherein the at least one coil is configured to be activated by electromagnetic field generated by a set of selected antennas associated with a touch location of the tool approximate to the interactive input system, to power the at least one NFC transponder; and the at least one NFC transponder is configured to transmit out an identity associated with an attribute of the tool, the identity being received by the interactive input system for determining the attribute of the tool.

19. The tool of claim 18, wherein the at least one coil operates within globally available and unlicensed radio frequency band.

20. The tool of claim 19 comprising: a first NFC transponder and a first coil associated with the first NFC transponder located approximate to a pen tip end of the tool, and a second NFC transponder and a second coil associated with the second NFC transponder located at a back end of the tool, the first coil being activated using less induced energy from the electromagnetic field than the second coil.

* * * * *